July 17, 1956
G. PATTERSON
2,754,802
ANIMAL LOADING CHUTE
Filed Sept. 17, 1954
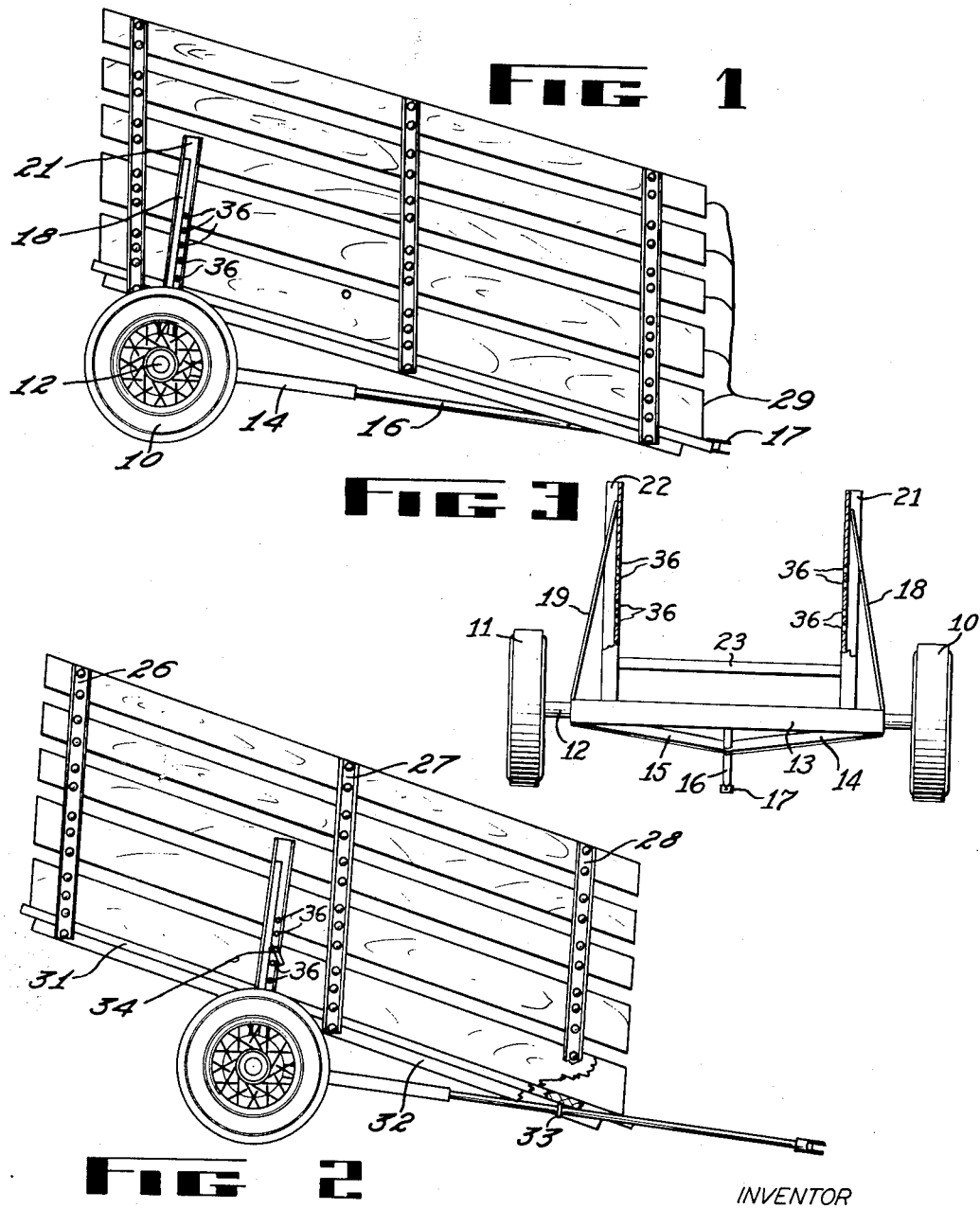
INVENTOR
GLEN PATTERSON
BY
ATTORNEY

United States Patent Office 2,754,802
Patented July 17, 1956

2,754,802

ANIMAL LOADING CHUTE

Glen Patterson, Danbury, Iowa

Application September 17, 1954, Serial No. 456,742

3 Claims. (Cl. 119—82)

This invention relates in general to animal loading chutes, and in particular to a chute which may be easily moved from place to place.

It is oftentimes desirable for stock owners to load hogs, cattle, sheep, or other animals on trucks or other transports. Because of the high entrance of most transports, it is necessary to use a chute to carry animals from the ground leved to the transport level.

This is oftentimes accomplished by utilizing a stationary chute and by positioning the transport adjacent the chute. However, at times it is desirable to load at different positions.

It is an object of this invention, therefore, to provide a portable chute which may be easily moved and adjusted to various heights.

Another object is to provide a simple loading chute.

A feature of this invention is found in the provision for a frame mounted on a pair of ground wheels and with an adjustable chute receivable thereon.

Further features, objects, and advantages of this invention will become apparent from the following description and claims, when read in view of the drawings; in which:

Figure 1 is a side view of the portable chute of this invention in the loading position;

Figure 2 is a side view of the apparatus in the portable position; and

Figure 3 is a front view.

Figure 3 illustrates the frame structure for supporting and transporting the chute and comprises a pair of ground wheels 10 and 11 which are rotatably supported on an axle 12. A bolster 13 is mounted on the axle 12 and a pair of tongue supports 14 and 15 are attached to the ends thereof and to a tongue 16 which is also connected to the bolster 13. A hitch 17 is attached to the end of the tongue 16 and may be connected to a suitable towing means, as for example a tractor or truck.

A pair of braces 18 and 19 extend upward from the bolster 13 and are attached to uprights 21 and 22 that have their lower ends attached to the bolster. A crosspiece 23 extends between the uprights 21 and 22.

As best shown in Figures 1 and 2, the chute comprises a number of side braces 26, 27, and 28, to which are attached side boards 29. A bottom 31 joins opposite sides of the chute, and a bottom guide 32 is attached to the center and carries a loop 33 at its forward end which passes around the tongue 16.

The uprights 21 and 22 are formed with a plurality of holes 36 through which an adjusting rod 34 extends. The bottom guide 32 of the chute rests on the rod 34.

Figure 2 illustrates the chute in the portable position wherein the chute has been moved longitudinally along the tongue 16 and the rod 34 has been inserted in a locking hold formed in the lower board 39 of the chute. It is to be particularly noted that the tongue 16 extends beyond the end of the chute to allow the hitch 17 to be connected to the towing means.

Figure 1 illustrates the chute in the loading position wherein the rod 34 has been removed to allow the chute to move forward on the tongue 16. It is also to be realized that the hitch 17 is disconnected from the towing means so that the tongue may engage the ground.

The rod 34 is inserted through one of the holes 36 in the member 21, and one of the holes in the member 22. Since there are a plurality of holes 36, the height of one end of the chute may be adjusted by using various holes.

It is seen that this invention provides a portable chute which may be easily changed from the loading to portable condition.

Although this invention has been described with respect to a preferred embodiment, it is not to be so limited, as changes in modification may be made which are within the full intended scope as defined by the appended claims.

I claim:

1. An animal loading chute comprising, an axle, a pair of ground wheels mounted thereon, a tongue attached to the axle, a pair of upright members attached to the axle and formed with a plurality of holes, a rod receivable through the holes, a chute mounted between the upright members and on the rod which extends through the holes, and one end of the chute slidably connected to the tongue.

2. An animal loading chute comprising, a frame structure having an axle, a tongue attached to the axle, a pair of ground wheels mounted on the axle, a pair of upright members attached to the axle and formed with a plurality of holes, a rod extending through the holes, a chute slidably engaged by the rod at one end, a loop attached to the other end of the chute and receivable over the tongue, and said chute movable from a first portable position to a second loading position.

3. A loading chute comprising, a frame with an axle, ground wheels mounted on the axle, a bolster attached to the axle, a pair of upright members attached to the bolster and formed with a plurality of holes, a rod receivable through said holes to form a horizontal support that may be adjusted in height, a chute receivable between said upright members and on said rod, a loop attached to the underside of one end of the chute and slidably received over said tongue.

References Cited in the file of this patent

UNITED STATES PATENTS

| | | |
|---|---|---|
| 758,426 | Dawson | Apr. 26, 1904 |
| 1,314,498 | Bowen | Sept. 2, 1919 |
| 2,174,063 | Richards | Sept. 26, 1939 |